(12) United States Patent
Lee

(10) Patent No.: US 7,833,364 B2
(45) Date of Patent: Nov. 16, 2010

(54) METHOD OF PRODUCING BICYCLE RATCHET BUSHING

(75) Inventor: Chang Chi Lee, Fengyuan (TW)

(73) Assignee: Nexxt Alloy Industrial Co., Ltd, Fengyuan (TW)

( * ) Notice: Subject to any disclaimer, the term of this patent is extended or adjusted under 35 U.S.C. 154(b) by 165 days.

(21) Appl. No.: 12/276,451

(22) Filed: Nov. 24, 2008

(65) Prior Publication Data

US 2010/0126641 A1    May 27, 2010

(51) Int. Cl.
*C22F 1/04* (2006.01)
*A63H 17/00* (2006.01)

(52) U.S. Cl. .................... 148/690; 148/550; 148/689; 446/440

(58) Field of Classification Search ............ 148/565, 148/550, 689, 590; 446/440
See application file for complete search history.

(56) References Cited

U.S. PATENT DOCUMENTS 5,557,962 A * 9/1996 Takikawa .................. 72/260
7,214,281 B2 * 5/2007 Gheorghe et al. .......... 148/550

OTHER PUBLICATIONS

ASTM International, Designation: B221M-02, Standard Specification For Aluminum And Aluminum-Alloy Extruded Bars, Rods, Wire, Profiles, And Tubes [Metric], Oct. 10, 2002.
Overview of materials for 2000 Series Aluminum Alloy.
Overview of materials for 7000 Series Aluminum Alloy.
Magnesium AZ31B, Extruded Hollow Shapes.
Magnesium AZ61A-F, Extruded Hollow Shapes.
Magnesium AZ80A-T5, Extruded.
Magnesium ZK60A-T5,Extruded.

* cited by examiner

*Primary Examiner*—Jerry Lorengo
*Assistant Examiner*—Rebecca Lee
(74) *Attorney, Agent, or Firm*—Ming Chow; Sinorica, LLC

(57) ABSTRACT

A method of producing bicycle ratchet bushing is provided, wherein an alloyed fundamental material is applied to the processes of a modeling process and a detailing treatment to form a product of bicycle ratchet bushing. Wherein, when the processes of drilling and tapping a hole of the modeling process are completed, the tapped hole of the workpiece is connected to a screw rod, and the screw rod is clamped by a drawing machine, so that the workpiece can be penetrated through the mold of the drawing machine to proceed with the drawing process. When the drawing process is working, it is not necessary to apply a head-hitting process to the workpiece as the conventional drawing method does, therefore the outer teeth of the ratchet of the workpiece will not be deformed by an external force, and can penetrated into the mold for further drawing process, therefore the whole manufacturing processes can be controlled efficiently.

13 Claims, 5 Drawing Sheets

METHOD OF PRODUCING BICYCLE RATCHET BUSHING

BACKGROUND OF THE INVENTION

1. Field of the Invention

The present invention is related to a method for producing a ratchet bushing used in a bicycle, more particularly to a producing process for forming the ratchet bushing of bicycle.

2. Description of the Prior Art

A conventional method for producing a bicycle ratchet bushing is shown in FIG. 5, wherein, the ratchet bushing 70 is formed by processing a fundamental material 50 to be treated by means of extrusion process 61, cutting process 62, annealing process 63, coating treatment 64, cold forging process 65, turning or drilling process 66, solid solution treatment 67, artificial aging treatment 68 and surface treatment 69.

In addition, one conventional method for producing a rod by drawing method, an extruded material 50 is applied to a head-hitting process 81 (not shown) to narrow down the shape of the head of the extruded material 50, so that it can be penetrated through the mold of the drawing machine to proceed with the manufacturing of drawing process 80. However, the conventional method has contained some improvable defects, such as:

1. Higher damage rate of the work: due to the process of head-hitting is applied to the extruded material, the shape of the extruded material could possibly be destroyed or deformed during the hitting process, resulting in the difficulty of the extruded material to penetrate into the mold of the drawing machine; or the outline of the extruded material could possibly be changed during the hitting process, resulting in an uneven reduction of the thickness to the extruded material when processing of the drawing, and that will influence the consistence of smoothness of the extruded material on its surface or size, to finally result in the scrap of the product. Therefore, the damage rate of the products is extremely high; and 2. Inefficiency of manufacturing control: since the conventional method of producing the bicycle ratchet bushing, the fundamental material has to be treated by extrusion process, cutting process, annealing process, coating treatment, cold forging process, turning or drilling process, solid solution treatment, artificial aging treatment and surface treatment, so as the ratchet bushing is to be formed. However, the aforesaid manufacturing processes are very trivial and complicated, besides, a forging mold for the cold forging process is needed to be redesigned, and that would lead the manufacturing costs to increase significantly, as well as the inefficiency of manufacture. Therefore, the manufacturing control of the working process is poor.

The present invention is intended to improve the above mentioned drawbacks of the conventional method of producing the bicycle ratchet bushing. The present invention provides improved solutions to the problems of high damage rate of the work and Inefficiency of manufacturing control.

SUMMARY OF THE INVENTION

The primary object for the present invention is to provide a method of producing bicycle ratchet bushing, comprising a modeling process and a detailing treatment; when the processes of drilling and tapping a hole to the workpiece of the modeling process are completed, the tapped hole of the workpiece is connected to a screw rod, and the screw rod is clamped by a drawing machine, so that the workpiece can be penetrated through the mold of the drawing machine to proceed with the drawing process. When the drawing process is working, it is not necessary to apply a head-hitting process to the workpiece as the conventional drawing method does, therefore the outer teeth of the ratchet of the workpiece will not be deformed by an external force, and can penetrated into the mold for further drawing process, therefore the whole manufacturing processes can be controlled efficiently.

DESCRIPTION OF THE PREFERRED EMBODIMENTS

Figure 1:
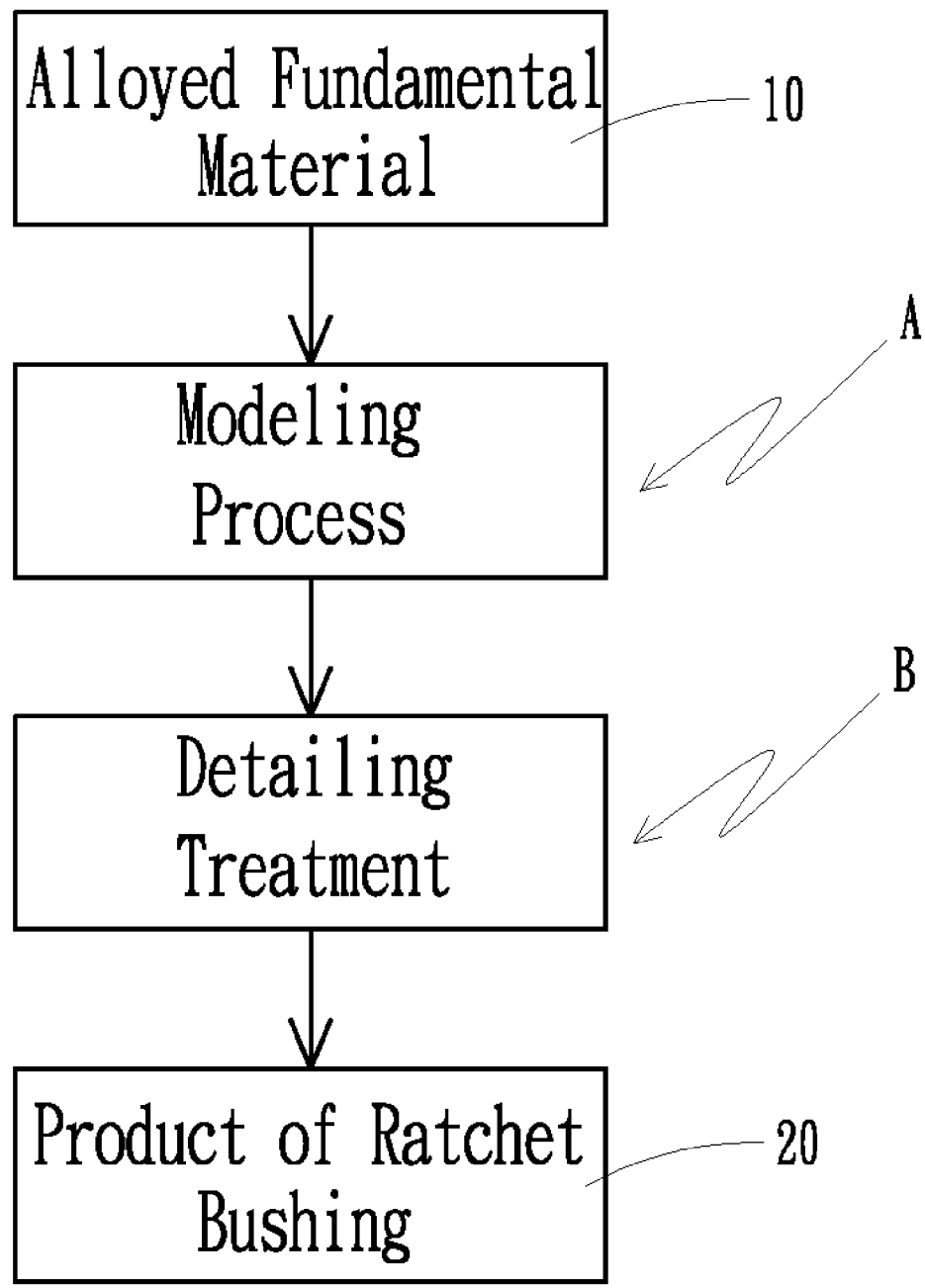
FIG. 1 illustrates a flowchart of the manufacturing processes in accordance with the present invention.

While this invention is capable of embodiment in many different forms, shown in the drawings and herein described in detail is the preferred embodiment of the invention. The preferred embodiment is disclosed with the understanding that the present description is but one example of the principles of the invention and is not intended to limit the broad aspects of the invention to the single embodiment illustrated.

Figure 2:
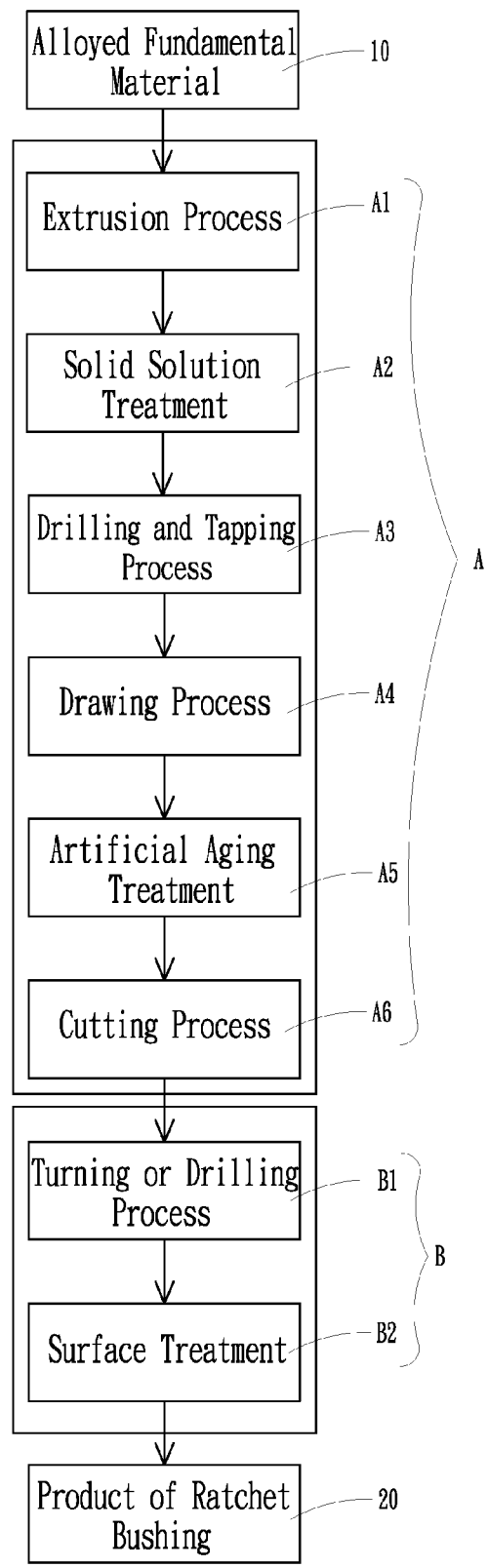
FIG. 2 illustrates a flowchart of the detailing process in accordance with the present invention.
Figure 3:
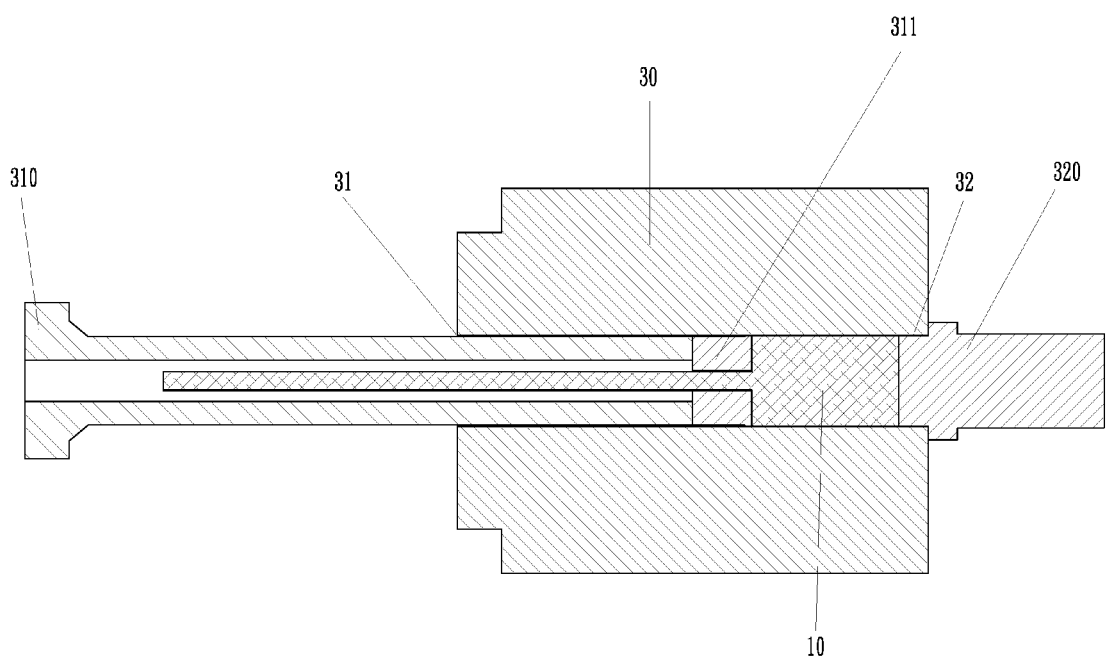
FIG. 3 illustrates a cross-sectional structure view of the extruding process in accordance with the present invention.
Figure 4:
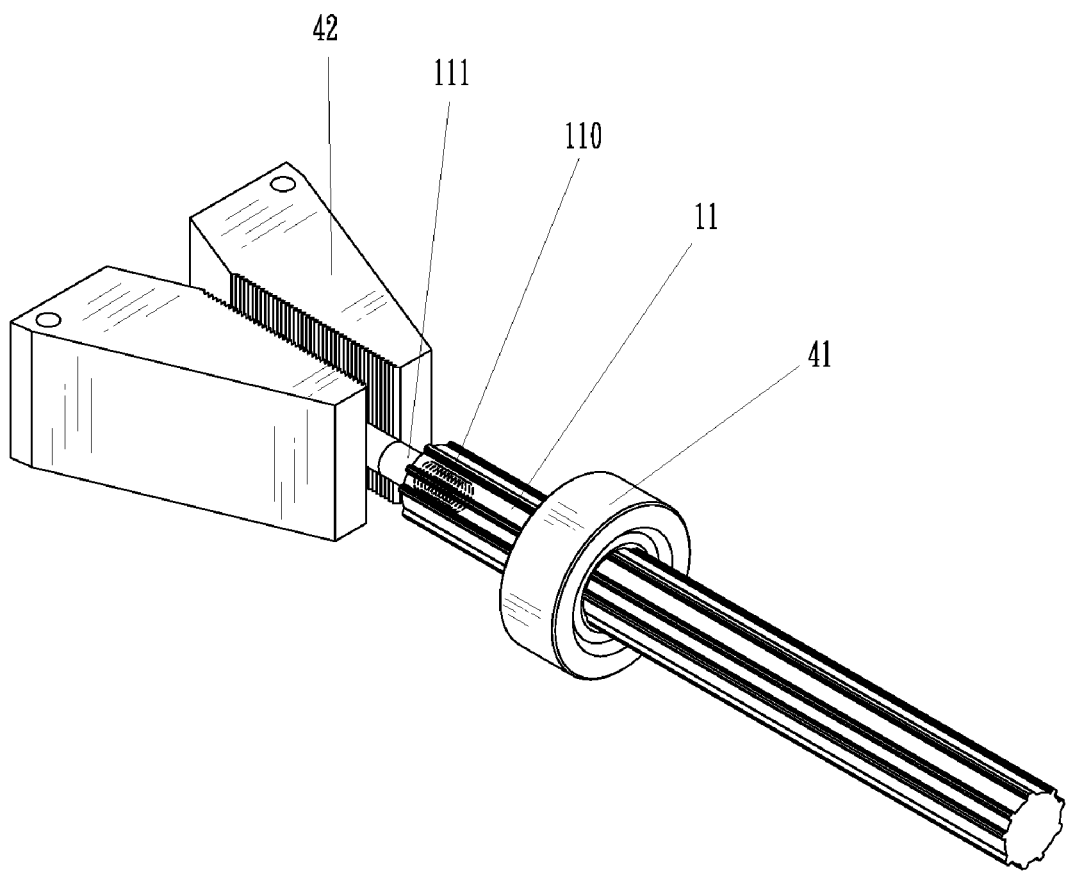
FIG. 4 illustrates a perspective view of the drawing process in accordance with the present invention.
Figure 5:
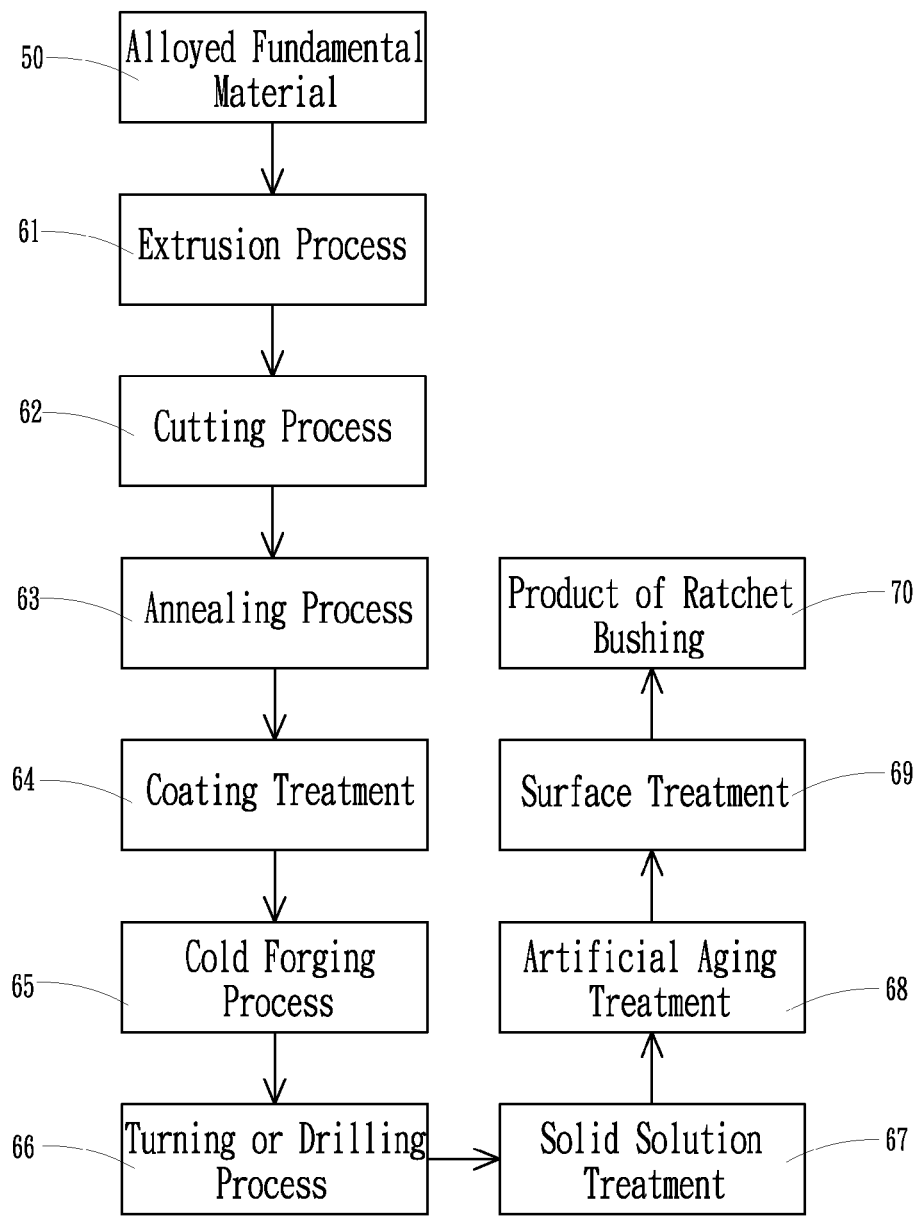
FIG. 5 illustrates a flowchart of the conventional manufacturing processes for producing a bicycle ratchet bushing.

FIGS. 1 and 2 are the flowcharts schematically showing a preferable embodiment of the present invention. The manufacturing method comprises: a modeling process A and detailing treatment B; wherein:

The modeling process A further comprises:

an extrusion process A1: an alloyed fundamental material 10 is heated to a temperature of plasticity (300° C.-550° C.), and then conveyed the heated alloyed fundamental material 10 to an ingot vessel 30; the ingot vessel 30 having a first opening 31 and a second opening 32, wherein, a molding rod 310 is inserted into the first opening 31, and a mold 311 is installed at the end of the molding rod 310; a pressing rod 320 is placed at the second opening 32 which is used for pressing the alloyed fundamental material 10 or the ingot vessel 30 to pass through the mold 311 to become an extruded material 11 (as shown in FIG. 3);

a solid solution treatment A2: the extruded material 11 is further heated to a solute temperature of alloy (400° C.-550° C.), stayed for 1 to 4 hours and quenched in a coolant which alternatively is a liquor solution or just air;

a drilling and tapping process A3: one end of the extruded material 11 which has been treated by the aforesaid solution treatment is drilled and tapped to form a tapped hole 110, the size of the tapped hole 110 is smaller than the extruded material 11 which is allowed a screw rod 111 to screw in;

a drawing process A4: the screw rod 111 which screwed into the tapped hole 110 is further penetrated through the mold 41 having 1 mm-0.02 mm smaller in size than the extruded material 11, furthermore, the screw rod 111 is clamped by a drawing machine 42, so that the extruded material 11 can be proceeding with the drawing process. After the process of drawing is completed, the screw rod 111 is released from the tapped hole 110 of the extruded material 11 (as shown in FIG. 4);

an artificial aging treatment A5: the extruded material 11, which has been drawn, is further heated to a temperature of 90° C.-200° C. and remains for 6 to 36 hours, to harden the extruded material 11; and a cutting process A6: the extruded material 11, which has been treated by aging process, is further to be cut into a required length.

The detailing treatment B further comprises:

a turning or drilling process B1: the extruded material 11, which has been cut in length, is further proceeded to the turning or drilling process with respect to the external diameter, internal diameter and screw thread of the extruded material 11; and a surface treatment B2: the extruded material 11, which has been turned and drilled, is further processed to the surface treatment to form a final product of bicycle ratchet bushing.

In the light of the manufacturing method described above, the present invention fulfills the production of a bicycle ratchet bushing thereof.

Please refer to FIGS. 1 and 2 which are the flowcharts schematically showing a preferable embodiment of the present invention. The alloyed fundamental material 10 is an extrusion ingot of aluminum alloy or magnesium alloy. Wherein, the aluminum alloy is series 2000 (for example: 2011, 2014, 2017, 2024 and 2038) and series 7000 (for example: 7001, 7003, 7005, 7017, 7046, 7050, 7075, 7175, 7475 and 7079). As for the magnesium alloy which is AZ31B, AZ61A, AZ80A and ZK60A.

Please refer to FIG. 2, the surface treatment B2 of the detailing treatment B is a sand blasting process, an anodic treatment, an electroplating process, a heat transfer process, a roast painting process, a printing process, a grinding process or a laser process, which is used for enhancing the colorful variation to the surface of the extruded material 11.

In the light of the above, the advantages of the present invention include:

1. Lower deformation or damage rate of the extruded material: due to the screw rod is screwed into the tapped hole of the extruded material and extended through the mold of the drawing machine, further to be clamped by the drawing machine for proceeding the drawing process, so, it is not necessary to apply the head-hitting process to the extruded material which could cause the deformation of the teeth of the ratchet, result in an uneven reduction of the thickness to the material when processing of the drawing, and that will influence the consistence of smoothness of the extruded material on its surface or size, to result in the scrap of the product; and 2. More efficiency of manufacturing control: due to the bicycle ratchet bushing of the present invention can be obtained when the modeling process is completed with the processes of the extruding process, the solid solution treatment, the drawing process and the artificial aging treatment which applied to the extruded material, and a further detailing treatment is completed with the processes of the turning and drilling process and surface treatment. Therefore, it is more efficiency than the conventional method which still required to process with the annealing process and cold forging process, besides the forging mold for the cold forging process has to be remolded. Comparing to the said conventional method, the present invention provides a manufacturing method which is more economy in cost and more efficiency in manufacturing control.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A method for producing bicycle ratchet bushing, comprising a modeling process and detailing treatment wherein:
the modeling process further comprising:
an extrusion process: an alloyed fundamental material is heated and then conveyed to an ingot vessel; the ingot vessel having a first opening and a second opening, wherein, a molding rod is inserted into the first opening, and a mold is installed at the end of the molding rod; a pressing rod is placed at the second opening which is used for pressing the alloyed fundamental material to pass through the mold to become an extruded material;
a solid solution treatment: the extruded material is further heated to a solute temperature with some time and quenched in a coolant;
a drilling and tapping process: one end of the extruded material which has been treated by the aforesaid solution treatment is drilled and tapped to form a tapped hole, the size of the tapped hole is smaller than the extruded material and a screw rod is screwed in the tapped hole;
a drawing process: the screw rod which is screwed into the tapped hole is further penetrated through the mold and clamped by a drawing machine and the extruded material proceeds with the drawing process; after the process of drawing is completed, the screw rod is released from the tapped hole of the extruded material;
an artificial aging treatment: the extruded material, which has been drawn, is further heated to a temperature with some time to harden the extruded material; and
a cutting process: the extruded material, which has been treated by aging process, is further to be cut into a required length; and
the detailing treatment further comprises:
a turning or drilling process: the extruded material, which has been cut in length, is further proceeded to the turning process or drilling process with respect to the external diameter, internal diameter and screw thread of the extruded material; and
a surface treatment: the extruded material, which has been turned and drilled, is further processed to the surface treatment to form a product of bicycle ratchet bushing.

2. The manufacturing method according to claim 1, wherein said extrusion process, the alloyed fundamental material is heated and then conveyed to an ingot vessel; the ingot vessel having a first opening and a second opening, wherein, a molding rod is inserted into the first opening, and a mold is installed at the end of the molding rod; a pressing rod is placed at the second opening which is used for pressing the ingot vessel, so that the alloyed fundamental material is passed through the mold to become an extruded material.

3. The manufacturing method according to claim 1, wherein the alloyed fundamental material is heated to a temperature of plasticity in the extrusion process.

4. The manufacturing method according to claim 1, wherein the extruded material is heated to a solute temperature of alloy and stayed for 1 to 4 hours in the solid solution treatment.

5. The manufacturing method according to claim 1, wherein said the solid solution treatment, the extruded material is heated to a solute temperature with some time and quenched in a coolant which is a liquor solution.

6. The manufacturing method according to claim 1, wherein said the solid solution treatment, the extruded material is heated to a solute temperature with some time and quenched in a coolant which is air.

7. The manufacturing method according to claim 1, wherein said drawing process, the mold is 1 mm-0.02 mm smaller than the extruded material.

8. The manufacturing method according to claim 1, wherein the extruded material is heated to a temperature of 90° C.-200° C. and remains for 6 to 36 hours in the artificial aging treatment.

9. The manufacturing method according to claim 1, wherein the alloyed fundamental material is an extrusion ingot of aluminum alloy.

10. The manufacturing method according to claim 9, wherein aluminum alloyed fundamental material is selected from series 2000 or series 7000.

11. The manufacturing method according to claim 1, wherein the alloyed fundamental material is an extrusion ingot of magnesium alloy.

12. The manufacturing method according to claim 11, wherein magnesium alloyed fundamental material is AZ31B, AZ61A, AZ80A and ZK60A.

13. The manufacturing method according to claim 1, wherein the surface treatment of the detailing treatment is a sand blasting process, an anodic treatment, an electroplating process, a heat transfer process, a roast painting process, a printing process, a grinding process or a laser process.

* * * * *